(12) United States Patent
Karin et al.

(10) Patent No.: US 6,735,005 B2
(45) Date of Patent: May 11, 2004

(54) CARTESIAN SCANNING SYSTEM

(75) Inventors: Jacob Karin, Ramat Gan (IL); Amnon Shtein, Hertzliya (IL)

(73) Assignee: Tokyo Seimitso (Israel) Ltd., Hertzliya (IL)

( * ) Notice: Subject to any disclaimer, the term of this patent is extended or adjusted under 35 U.S.C. 154(b) by 0 days.

(21) Appl. No.: 10/156,143

(22) Filed: May 29, 2002

(65) Prior Publication Data

US 2003/0090772 A1 May 15, 2003

Related U.S. Application Data

(60) Provisional application No. 60/331,152, filed on Nov. 9, 2001.

(51) Int. Cl.$^7$ .............................................. G02B 26/08
(52) U.S. Cl. ....................... 359/212; 359/198; 359/201; 359/202; 359/223; 250/201.2; 250/206.1; 356/498; 356/614; 369/44.11; 369/112.01; 369/44.37
(58) Field of Search ................................ 359/196, 198, 359/618, 201–202, 383, 391–392, 396; 250/201.2, 206.1, 234–236; 369/118, 44.11, 44.37–44.39, 112.01, 112.29, 116, 119; 356/445, 498, 500, 508, 614, 615, 622, 624; 358/474, 475, 494, 496

(56) References Cited

U.S. PATENT DOCUMENTS

| 5,151,749 A | * | 9/1992 | Tanimoto et al. ............ 356/375 |
| 5,432,622 A | | 7/1995 | Johnston et al. |
| 5,530,579 A | | 6/1996 | Nakamura et al. |
| 5,771,219 A | * | 6/1998 | Miyamoto .................... 369/112 |
| 6,563,781 B2 | * | 5/2003 | Hasegawa et al. ........... 369/118 |

* cited by examiner

*Primary Examiner*—James Phan
(74) *Attorney, Agent, or Firm*—Mark M. Friedman

(57) ABSTRACT

A Cartesian scanning system for scanning a surface of a sample. The scanning system includes a light source assembly configured to produce at least one collimated beam of light, a light sensing system, a stage configured for mounting the sample thereon and a linear track having a direction of elongation. The linear track and the stage are configured to move relative to each other. The scanning system also includes a scanning head having a reflecting system which is configured to direct the collimated beam of light onto the surface and to direct a beam of light reflected from the surface to the light sensing system. The scanning head is slidably associated with the linear track so as to be moveable in a direction parallel to a direction of elongation of the linear track. Also included are a position determination system and a scan displacement correction system.

47 Claims, 4 Drawing Sheets

CARTESIAN SCANNING SYSTEM

This application claims the benefit of U.S. Provisional Application No. 60/331,152 filed Nov. 9, 2001.

FIELD AND BACKGROUND OF THE INVENTION

The present invention relates to a Cartesian scanning system and, in particular, it concerns optical non-contact scanning devices for determining the physical condition of a specimen.

One of the problems encountered in relation to Cartesian scanning systems is the frequent velocity reversals required at the end of each swath. Such reversals use large quantities of energy and introduce vibrations and mechanical distortion into the system. In order to reduce these problems the scanning head needs to be very small and lightweight.

The above problems are compounded in relation to a wafer inspection system where a high degree of accuracy is required. By way of introduction, semiconductor wafers are produced by a complicated multi-step process and involve sub-micron range technologies. Technologies in the sub-micron range are very delicate and error or malfunction needs to be detected as soon as possible. Effective inspection of wafers is therefore required. Automated devices for inspection have been developed since the 1970's including precision stage positioning systems and auto-focus systems. Further developments in the Art included the introduction of automatic inspection machines, which analyze inspected wafers and determine a defect location automatically. The future generation of wafers, which will require a scanning resolution of less than 0.1 microns, cannot be scanned using current available mechanical structures as they are not rigid enough to provide the required accuracy at the required throughput. Therefore, designing a wafer inspection system for the sub 0.1 micron range places the repeatability and accuracy tolerances of the inspection system to the 10 nanometer range. Working at the nanometer range, most mechanical systems are "rubber like" due to the limited rigidity of the structures at this resolution. Therefore, designing and manufacturing mechanical structures that conform to such high demands is expensive and the resulting systems are bulky and difficult to maintain. High resolution can be achieved by scanning a flat specimen at a low speed, by keeping the scanning head stationary and mechanically floating above a moving specimen.

Of most relevance to the present invention is U.S. Pat. No. 5,530,579, a polygon scanner. The polygon scanner allows scanning a surface with a minimal number of moving parts. However, a shortcoming of the polygon scanner is the requirement to vary the distance between the specimen and the camera, leading to a distortion of the image at high resolutions. A further shortcoming of the polygon scanner is the inherent change of angle of reflectance in the system. This shortcoming is correctable using a special correcting lens but this also leads to image distortion and increased cost.

Also of relevance to the present invention is U.S. Pat. No. 5,432,622 to Johnston et al. relating to a high resolution scanning apparatus. However, the Johnston et al. patent does not produce high throughput.

There is therefore a need for a high throughput scanning system that operates at a resolution in the nanometer range.

SUMMARY OF THE INVENTION

The present invention is a Cartesian scanning system and method of operation thereof.

According to the teachings of the present invention there is provided, a Cartesian scanning system for scanning a surface of a sample comprising: (a) a light source assembly configured to produce at least one collimated beam of light; (b) a light sensing system; (c) a stage configured for mounting the sample thereon; (d) a linear track having a direction of elongation wherein: (i) the linear track and the stage are configured to move relative to each other in a direction substantially perpendicular to the direction of elongation; and (ii) the light source and the light sensing system are mounted in fixed spatial relation to the linear track; and (e) a scanning head including a reflecting system wherein: (i) the reflecting system is configured to direct the collimated beam of light onto the surface and to direct a beam of light reflected from the surface to the light sensing system; and (ii) the scanning head is slidably associated with the linear track so as to be moveable in a direction parallel to the direction of elongation.

According to a further feature of the present invention, there is also provided a beam splitter configured to enable a beam of light being transmitted by the light source and a beam of light being received by the light sensing system to share substantially a same path between the surface and the beam splitter.

According to a further feature of the present invention the beam splitter is a polarizing beam splitter.

According to a further feature of the present invention the light source is configured to produce a plurality of light beams that are collimated.

According to a further feature of the present invention the scanning head further includes an objective lens disposed between the reflecting system and the surface and wherein the objective lens is configured to focus a light beam onto the surface.

According to a further feature of the present invention, there is also provided at least one bearing disposed between the scanning head and the linear track.

According to a further feature of the present invention: (a) the stage is configured to move in a direction substantially perpendicular to the direction of elongation; and (b) the linear track is configured to be stationary.

According to a further feature of the present invention, there is also provided a position determination system configured to determine a position of the scanning head in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the position determination system including: (a) a first reflecting element mechanically connected to the scanning head; (b) a first optical displacement measurement device configured to measure the distance between the first optical displacement measurement device and the first reflecting element to determine the X-position wherein the first reflecting element faces the first optical displacement measurement device; (c) a second reflecting element mechanically connected to the scanning head; (d) a third reflecting element mechanically connected to the stage wherein the third reflecting element is substantially parallel to the direction of elongation of the linear track; (e) a second optical displacement measurement device configured to measure the distance from the second optical displacement measurement device to the third reflecting element via the second reflecting element wherein the second reflecting element is positioned to enable a light beam to be transmitted between the second optical displacement measurement device and the third reflecting element; and (f) a feedback system configured to determine the Y-position of the scanning head from an output of the first optical displacement measurement device and an output of the second optical displacement measurement device.

According to a further feature of the present invention, there is also provided a scan displacement correction system configured to perform a real-time correction for a position of the scanning head, the position of the scanning head being defined in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the scan displacement correction system including: (a) a control system configured to determine a real-time correction command from the X-position of the scanning head and the Y-position of the scanning head; and (b) a deflection apparatus disposed between the light source and the scanning head, the deflection apparatus being configured to deflect parallel to the Y-axis a position of a light beam that is within a viewing window of the scanning head in response to the real-time correction command.

According to a further feature of the present invention the deflection apparatus is implemented as a piezoelectric crystal.

According to a further feature of the present invention the deflection apparatus includes: (a) a first reflecting element; and (b) an actuator which is configured to move the first reflecting element in response to the real-time correction command.

According to a further feature of the present invention the actuator is a piezoelectric actuator configured to move the first reflecting element.

According to a further feature of the present invention, there is also provided an auto-focus configuration disposed between the light source, the light sensing system and the reflecting system.

According to a further feature of the present invention, there is also provided a confocal optical configuration disposed between the light sensing system and the reflecting system.

According to the teachings of the present invention there is also provided, a method to scan a surface of a sample using a linear scanner, the scanner including a stage and a scanning head, the scanner having a light source assembly that is configured to produce a scanning beam having an adjustable intensity, the scanner having a light sensing system, the light sensing system having an associated interval between exposures of the light sensing system, the sample being mounted on the stage, the surface having an inspection region, the method comprising the steps of: (a) moving the scanning head through a scanning path, the moving including accelerating and decelerating the scanning head wherein at least part of the accelerating and decelerating occurs over the inspection region; (b) adjusting the interval between exposures of the light sensing system in order to maintain a substantially constant pixel size during the accelerating and the decelerating; and (c) adjusting the intensity of the scanning beam in an inversely proportional relationship to a exposure time of the light sensing system.

According to a further feature of the present invention part of the acceleration and part of the deceleration occurs outside of the inspection region.

According to the teachings of the present invention there is also provided a position determination system configured to determine a position of a scanning head of a Cartesian scanning system, the scanning system having a stage configured to mount a sample thereon, the scanning system having a linear track having a direction of elongation, the linear track and the stage being configured to move relative to each other in a direction substantially perpendicular to the direction of elongation, the scanning head being slidably associated with the linear track so as to be moveable in a direction parallel to the direction of elongation, the position of the scanning head being defined in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the position determination system comprising: (a) a first reflecting element having a plane of reflection that is parallel to the Y-axis wherein the first reflecting element is mechanically connected to the scanning head; (b) a first optical displacement measurement device configured to measure the distance between the first optical displacement measurement device and the first reflecting element to determine the X-position; (c) a second reflecting element mechanically connected to the scanning head; (d) a third reflecting element having a plane of reflection that is parallel to the X-axis wherein the third reflecting element is mechanically connected to the stage; (e) a second optical displacement measurement device configured to measure the distance from the second optical displacement measurement device to the third reflecting element via the second reflecting element wherein the second reflecting element is positioned to enable a light beam to be transmitted between the second optical displacement measurement device and the third reflecting element; and (f) a feedback system configured to determine the Y-position of the scanning head from an output of the first optical displacement measurement device and an output of the second optical displacement measurement device.

According to a further feature of the present invention, the position determination system being further configured to perform a real-time correction for the position of the scanning head, the scanner including a light source, the positive feedback system further including: (a) a control system configured to determine a real-time correction command from the X-position of the scanning head and the Y-position of the scanning head; and (b) a deflection apparatus disposed between the light source and the scanning head, the deflection apparatus being configured to deflect parallel to the Y-axis a position of a light beam that is within a viewing window of the scanning head in response to the real-time correction command.

According to a further feature of the present invention the deflection apparatus is implemented as a piezoelectric crystal.

According to a further feature of the present invention the deflection apparatus includes: (a) a fourth reflecting element; and (b) an actuator which is configured to move the fourth reflecting element in response to the real-time correction command.

According to a further feature of the present invention the actuator is a piezoelectric actuator configured to move the fourth reflecting element.

According to the teachings of the present invention there is also provided a scan displacement correction system configured to perform a real-time correction for a position of a scanning head of a Cartesian scanning system, the scanning system having a stage configured to mount a sample thereon, the scanning system having a light source, the scanning system having a linear track having a direction of elongation, the linear track and the stage being configured to move relative to each other in a direction substantially perpendicular to the direction of elongation, the scanning head being slidably associated with the linear track so as to be moveable in a direction parallel to the direction of elongation, the position of the scanning head being defined in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the scan displacement correction system including: (a) a control system configured to determine a real-time correction command from the X-position of the scanning head and the Y-position of the scanning head; and (b) a deflection apparatus disposed between the light source and the scanning head, the deflection apparatus being configured to deflect parallel to the Y-axis a position of a light beam that is within a viewing window of the scanning head in response to the real-time correction command.

According to a further feature of the present invention the deflection apparatus is implemented as a piezoelectric crystal.

According to a further feature of the present invention the deflection apparatus includes: (a) a reflecting element; and (b) an actuator which is configured to move the reflecting element in response to the real-time correction command.

According to a further feature of the present invention the actuator is a piezoelectric actuator configured to move the reflecting element.

According to the teachings of the present invention there is also provided a method to perform a real-time correction for a position of a scanning head of a Cartesian scanning system, the scanning system having a stage configured to mount a sample thereon, the scanning system having a linear track having a direction of elongation, the linear track and the stage being configured to move relative to each other in a direction substantially perpendicular to the direction of elongation, the scanning head being slidably associated with the linear track so as to be moveable in a direction parallel to the direction of elongation, the position of the scanning head being defined in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the method comprising the steps of: (a) determining a real-time correction command from the X-position of the scanning head and the Y-position of the scanning head due to a misalignment of at least one of the X-position and the Y-position of the scanning head from an expected position of the scanning head; and (b) deflecting a position of a light beam parallel to the Y-axis in response to the real-time correction command, the light beam being within a viewing window of the scanning head.

According to the teachings of the present invention there is also provided a Cartesian writing system for writing on an optically recordable surface of a medium comprising: (a) a light source assembly configured to produce a collimated beam of light having an adjustable intensity; (b) a stage configured for mounting the medium thereon; (c) a linear track having a direction of elongation wherein: (i) the linear track and the stage are configured to move relative to each other in a direction substantially perpendicular to the direction of elongation; and (ii) the light source is mounted in fixed spatial relation to the linear track; and (d) a writing head including a reflecting system wherein: (i) the reflecting system is configured to direct the collimated beam of light onto the optically recordable surface; and (ii) the writing head is slidably associated with the linear track so as to be moveable in a direction parallel to the direction of elongation.

According to a further feature of the present invention the writing head further includes an objective lens disposed between the reflecting system and the optically recordable surface and wherein the objective lens is configured to focus a light beam onto the optically recordable surface.

According to a further feature of the present invention, there is also provided at least one bearing disposed between the writing head and the linear track.

According to a further feature of the present invention: (a) the stage is configured to move in a direction substantially perpendicular to the direction of elongation; and (b) the linear track is configured to be stationary.

According to a further feature of the present invention, there is also provided a position determination system configured to determine a position of the writing head in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the position determination system including: (a) a first reflecting element mechanically connected to the writing head; (b) a first optical displacement measurement device configured to measure the distance between the first optical displacement measurement device and the first reflecting element to determine the X-position wherein the first reflecting element faces the first optical displacement measurement device; (c) a second reflecting element mechanically connected to the writing head; (d) a third reflecting element mechanically connected to the stage wherein the third reflecting element is substantially parallel to the direction of elongation of the linear track; (e) a second optical displacement measurement device configured to measure the distance from the second optical displacement measurement device to the third reflecting element via the second reflecting element wherein the second reflecting element is positioned to enable a light beam to be transmitted between the second optical displacement measurement device and the third reflecting element; and (f) a feedback system configured to determine the Y-position of the writing head from an output of the first optical displacement measurement device and an output of the second optical displacement measurement device.

According to a further feature of the present invention, there is also provided a displacement correction system configured to perform a real-time correction for a position of the writing head, the position of the writing head being defined in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the displacement correction system including: (a) a control system configured to determine a real-time correction command from the X-position of the writing head and the Y-position of the writing head; and (b) a deflection apparatus disposed between the light source and the writing head, the deflection apparatus being configured to deflect parallel to the Y-axis a position of a light beam that is within a viewing window of the writing head in response to the real-time correction command.

According to a further feature of the present invention the deflection apparatus is implemented as a piezoelectric crystal.

According to a further feature of the present invention the deflection apparatus includes: (a) a first reflecting element; and (b) an actuator which is configured to move the first reflecting element in response to the real-time correction command.

According to a further feature of the present invention the actuator is a piezoelectric actuator configured to move the first reflecting element.

According to a further feature of the present invention, there is also provided an auto-focus configuration disposed between the light source and the reflecting system.

According to the teachings of the present invention there is also provided a method to write on an optically recordable surface of a medium using a linear writing system, the writing system including a stage and a writing head, the writing system having a light source assembly that is configured to produce a writing beam having an adjustable intensity, the medium being mounted on the stage, the optically recordable surface having an writing region, the method comprising the steps of: (a) moving the writing head through a writing path, the moving including accelerating and decelerating the writing head wherein at least part of the accelerating and decelerating occurs over the writing region; (b) adjusting the interval between shots of the light source assembly and the duration of the shots in order to maintain a substantially constant pixel spacing and a substantially constant pixel size, respectively, during the accelerating and the decelerating; and (c) adjusting the intensity of the writing beam in an inversely proportional relationship to the duration of the shots.

According to a further feature of the present invention part of the acceleration and part of the deceleration occurs outside of the writing region.

According to the teachings of the present invention there is also provided a position determination system configured to determine a position of a writing head of a Cartesian writing system, the writing system having a stage configured to mount a medium thereon, the writing system having a linear track having a direction of elongation, the linear track and the stage being configured to move relative to each other in a direction substantially perpendicular to the direction of elongation, the writing head being slidably associated with the linear track so as to be moveable in a direction parallel to the direction of elongation, the position of the writing head being defined in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the position determination system comprising: (a) a first reflecting element having a plane of reflection that is parallel to the Y-axis wherein the first reflecting element is mechanically connected to the writing head; (b) a first optical displacement measurement device configured to measure the distance between the first optical displacement measurement device and the first reflecting element to determine the X-position; (c) a second reflecting element mechanically connected to the writing head; (d) a third reflecting element having a plane of reflection that is parallel to the X-axis wherein the third reflecting element is mechanically connected to the stage; (e) a second optical displacement measurement device configured to measure the distance from the second optical displacement measurement device to the third reflecting element via the second reflecting element wherein the second reflecting element is positioned to enable a light beam to be transmitted between the second optical displacement measurement device and the third reflecting element; and (f) a feedback system configured to determine the Y-position of the writing head from an output of the first optical displacement measurement device and an output of the second optical displacement measurement device.

According to a further feature of the present invention the position determination system is further configured to perform a real-time correction for the position of the writing head, the writing system including a light source, the positive feedback system further including: (a) a control system configured to determine a real-time correction command from the X-position of the writing head and the Y-position of the writing head; and (b) a deflection apparatus disposed between the light source and the writing head, the deflection apparatus being configured to deflect parallel to the Y-axis a position of a light beam that is within a viewing window of the writing head in response to the real-time correction command.

According to a further feature of the present invention the deflection apparatus is implemented as a piezoelectric crystal.

According to a further feature of the present invention the deflection apparatus includes: (a) a fourth reflecting element; and (b) an actuator which is configured to move the fourth reflecting element in response to the real-time correction command.

According to a further feature of the present invention the actuator is a piezoelectric actuator configured to move the fourth reflecting element.

According to the teachings of the present invention there is also provided a displacement correction system configured to perform a real-time correction for a position of a writing head of a Cartesian writing system, the writing system having a stage configured to mount a medium thereon, the writing system having a light source, the writing system having a linear track having a direction of elongation, the linear track and the stage being configured to move relative to each other in a direction substantially perpendicular to the direction of elongation, the writing head being slidably associated with the linear track so as to be moveable in a direction parallel to the direction of elongation, the position of the writing head being defined in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the displacement correction system including: (a) a control system configured to determine a real-time correction command from the X-position of the writing head and the Y-position of the writing head; and (b) a deflection apparatus disposed between the light source and the writing head, the deflection apparatus being configured to deflect parallel to the Y-axis a position of a light beam that is within a viewing window of the writing head in response to the real-time correction command.

According to a further feature of the present invention the deflection apparatus is implemented as a piezoelectric crystal.

According to a further feature of the present invention the deflection apparatus includes: (a) a reflecting element; and (b) an actuator which is configured to move the reflecting element in response to the real-time correction command.

According to a further feature of the present invention the actuator is a piezoelectric actuator configured to move the reflecting element.

According to the teachings of the present invention there is also provided a method to perform a real-time correction for a position of a writing head of a Cartesian writing system, the writing system having a stage configured to mount a medium thereon, the writing system having a linear track having a direction of elongation, the linear track and the stage being configured to move relative to each other in a direction substantially perpendicular to the direction of elongation, the writing head being slidably associated with the linear track so as to be moveable in a direction parallel to the direction of elongation, the position of the writing head being defined in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the method comprising the steps of: (a) determining a real-time correction command from the X-position of the writing head and the Y-position of the writing head due to a misalignment of at least one of the X-position and the Y-position of the writing head from an expected position of the writing head; and (b) deflecting a position of a light beam parallel to the Y-axis in response to the real-time correction command, the light beam being within a viewing window of the writing head.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a Cartesian scanning system and methods of operation thereof. For the purposes of illustration, the Cartesian scanning system and methods of operation thereof will be described with reference to an inspection device. However, it will be apparent to those skilled in the Art that the teachings of the present invention also apply, but are not limited to, a writing system.

The principles and operation of the Cartesian scanning system according to the present invention may be better understood with reference to the drawings and the accompanying description.

Figure 1:
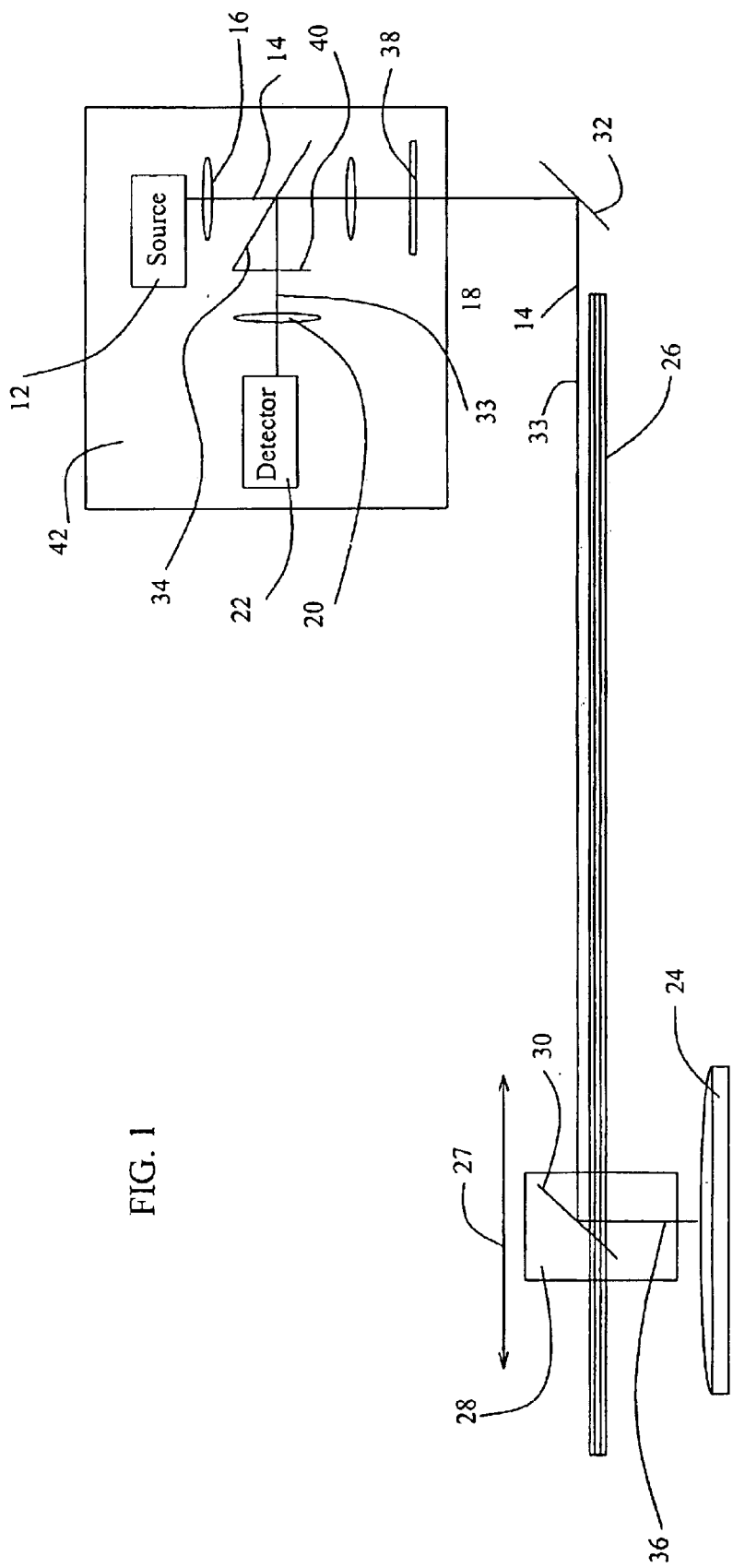
FIG. 1 is a schematic side view of a Cartesian scanning system that is constructed and operable in accordance with a preferred embodiment of the invention.

Reference is now made to FIG. 1, which is a schematic side view of a Cartesian scanning system 10 that is constructed and operable in accordance with a preferred embodiment of the invention. Scanning system 10 includes a light source assembly 12 configured to produce at least one collimated beam of light. Typically, light source assembly 12 is configured to produce a plurality of collimated beams of light 14. It should be noted that light source assembly 12 is either a light source plus optical apparatus which is configured to produce collimated beams of light 14 or a light source that produces collimated beams of light 14 without the need for further optical apparatus. The optical apparatus required to produce collimated beams of light 14 is represented in simplified form by a lens 16 and a lens 18. It should be noted that the production of collimated beams of light 14 is known to those skilled in the art. Scanning system 10 also includes a light sensing system 22, a stage 24 configured for mounting a sample 25 thereon and a linear track 26 having a direction of elongation 27. Light sensing system 22 is typically a CCD or a TDI camera. Linear track 26 and stage 24 are configured to move relative to each other in a-direction substantially perpendicular to direction of elongation 27. However, in the most preferred embodiment of this invention, stage 24 is configured to move in a direction substantially perpendicular to direction of elongation 27, while linear track 26 is configured to be stationary, thereby improving the throughput of scanning system 10. Light source assembly 12 and light sensing system 22 are mounted in fixed spatial relation to linear track 26. Scanning system 10 also includes a scanning head 28. Scanning head 28 is slidably associated with linear track 26 so as to be moveable in a direction parallel to direction of elongation 27. Scanning head 28 includes a reflecting system 30. At least one bearing, typically a fluid bearing, is disposed between scanning head 28 and linear track 26 to enable scanning head 28 to move with minimum friction along linear track 26. Collimated beams of light 14 produced by light source assembly 12, lens 16 and lens 18 are directed towards a reflecting element 32. Reflecting element 32 is typically a mirror. Reflecting element 32 directs collimated beams of light 14 towards reflecting system 30. Reflecting system 30 is configured to direct collimated beams of light 14 onto an inspection surface of sample 25 and to direct a plurality beams of light 33 reflected from the inspection surface to reflecting element 32. Reflecting system 30 is typically a single reflecting surface such as a mirror. Reflected beams of light 33 are directed by reflecting element 32 to a beam splitter 34. Beam splitter 34 directs reflected beams of light 33 via a lens 20 to light sensing system 22. An optical apparatus, represented in simplified form by lens 20, is typically required to enable light sensing system 22 to receive reflected beams of light 33, as reflected beams of light 33 are collimated. Therefore, beam splitter 34 is configured to enable a beam of light being transmitted by light source assembly 12 and a beam of light being received by light sensing system 22 to share substantially a same path between the inspection surface and beam splitter 34. Beam splitter 34 is typically a polarizing beam splitter. The technology to produce beam splitter 34 is known by those skilled in the art and in order to make beam splitter 34 function, additional optical components (not shown) are needed, such as a quarter wavelength plate. Scanning head 28 also includes an objective lens 36 disposed between reflecting system 30 and the inspection surface. Objective lens 36 is configured to focus collimated beams of light 14 onto the inspection surface.

Since, collimated beams of light 14 are parallel beams of light, an optical image viewed by light sensing system 22 is unaffected by the change in distance between reflecting element 32 and scanning head 28. Therefore, scanning head 28 is moved to perform a scan without compromising the quality of the optical image. Moreover, scanning head 28 is lightweight as it contains very few components. Therefore, scanning head 28 allows for fast scanning at high speed and at the same time enables fast direction reversal of scanning head 28 without soaring energy losses and mechanical noise. Scanning head 28 also carries only a minimal amount of optical components and no electronic components, allowing scanning head 28 to withstand high acceleration rates.

In an alternative embodiment of the present invention, scanning system 10 also includes an auto-focus configuration 38. Auto-focus configuration 38 is disposed in the path of reflected beams of light 33. In an alternative embodiment of the present invention, scanning system 10 also includes a confocal optical configuration 40, typically a pin-hole array disposed between light sensing system 22 and reflecting system 30. Confocal optical configuration 40 allows the depth of field of the image to be restricted to a specific height.

Light source assembly 12, light sensing system 22, beam splitter 34 and lens 16, lens 18 and lens 20 are defined for convenience as light source and detector assembly 42.

Figure 2:
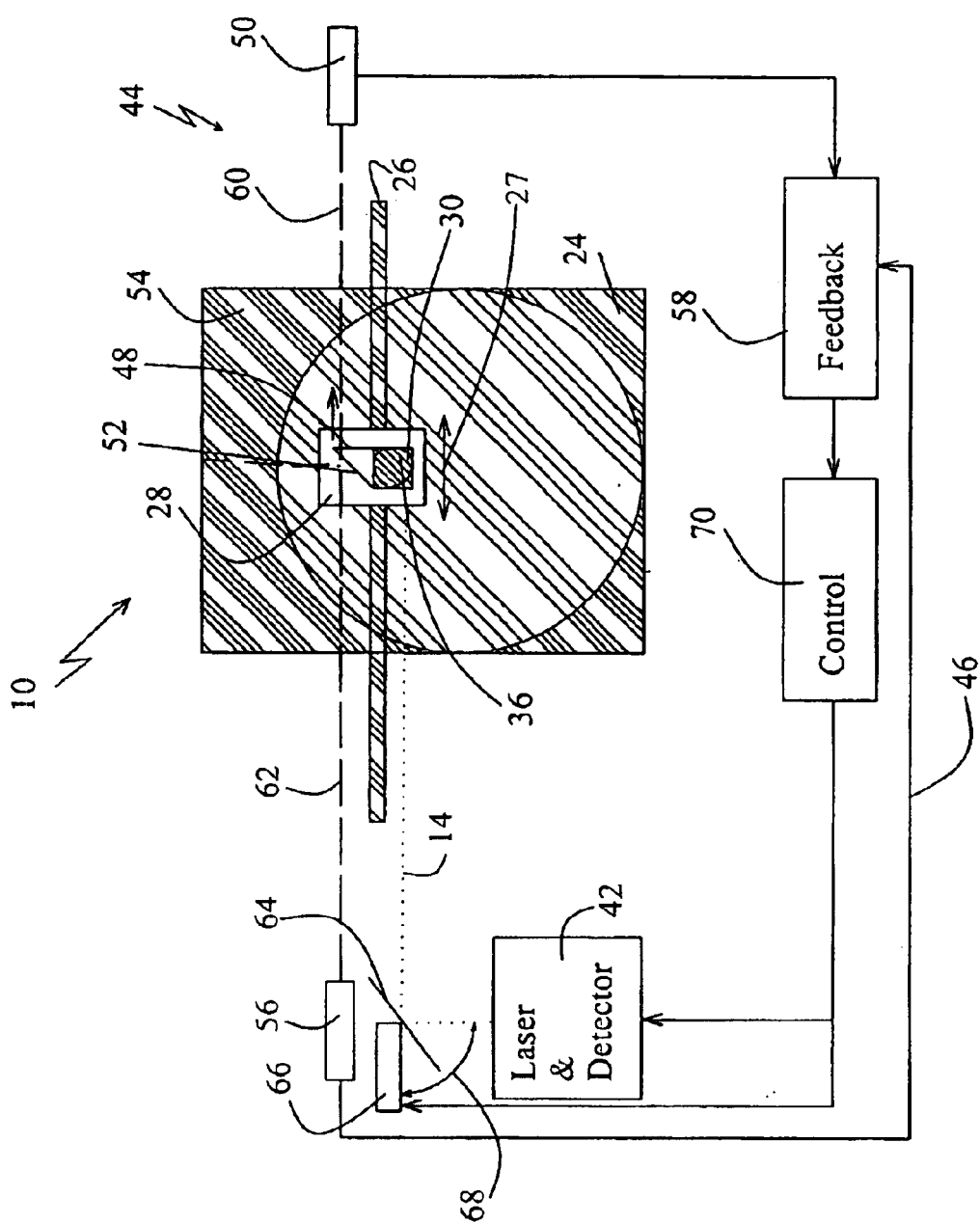
FIG. 2 is a schematic plan view of the Cartesian scanning system of FIG. 1 including a position determination system and a scan displacement correction system.

Reference is now made to FIG. 2, which is a schematic plan view of scanning system 10 of FIG. 1 including a position determination system 44 and a scan displacement correction system 46. By way of introduction, the present invention enables high resolution scanning at a resolution of greater than 50 nanometers by teaching an advanced control and feedback system. Position determination system 44 determines a precise position of scanning head 28, and scan displacement correction system 46 is configured to perform a real-time correction for a misalignment of scanning head 28 from the expected position of scanning head 28. Moreover, scan displacement correction system 46 compensates not only for location errors resulting from mechanical inaccuracies, but also makes a correction for the constant movement of stage 24 while at the same time scanning head 28 moves along linear track 26 parallel to direction of elongation 27, thereby enabling very high scanning throughput.

Position determination system 44 is configured to determine a position of scanning head 28 in relation to an X-position on an X-axis and a Y-position on a Y-axis. The X-axis and the Y-axis are defined in relation to stage 24. The X-axis is parallel to direction of elongation 27 of linear track 26. The Y-axis is orthogonal to the X-axis. Position determination system 44 includes a reflecting element 48, an optical displacement measurement device 50, a reflecting element 52, a reflecting element 54 and an optical displacement measurement device 56. Reflecting element 48 is typically a mirrored surface and is mechanically connected to scanning head 28. Optical displacement measurement device 50 is configured to measure the distance between optical displacement measurement device 50 and reflecting element 48 by optical displacement measurement device 50 by sending a test beam of light 60 to reflecting element 48. Test beam of light 60 is then reflected back to optical displacement measurement device 50 by reflecting element 48. Optical displacement measurement device 50 is typically an interferometer. As the position of optical displacement measurement device 50 is known in relation to linear track 26 the actual X-position of scanning head 28 can be determined by a feedback system 58. Therefore, reflecting element 48 is positioned so as to reflect back to optical displacement measurement device 50 test beam of light 60 produced by optical displacement measurement device 50. Reflecting element 52 is typically a mirrored surface and is mechanically connected to scanning head 28. Reflecting element 54 is typically a mirrored surface and is mechanically connected to stage 24 so that reflecting element 54 is substantially parallel to direction of elongation 27 of linear track 26. Optical displacement measurement device 56 is configured to measure the distance from optical displacement measurement device 56 to reflecting element 54 via reflecting element 52 by optical displacement measurement device 56 sending a test beam of light 62 to reflecting element 54 via reflecting element 52. Test beam of light 62 is reflected back by reflecting element 54 to optical displacement measurement device 56 via reflecting element 52. Therefore, reflecting element 52 is positioned to enable a light beam to be transmitted between optical displacement measurement device 56 and reflecting element 54. Optical displacement measurement device 56 is typically an interferometer. As the position of optical displacement measurement device 56 is known in relation to linear track 26 and the X-position of scanning head 28 is determined by feedback system 58 and the length of linear track 26 is known, the actual Y-position of scanning head 28 can be determined by feedback system 58.

Scan displacement correction system 46 includes a control system 70. Control system 70 is configured to determine real-time correction commands from the actual X-position and the actual Y-position of scanning head 28. Control system 70 compares the expected position of scanning head 28 with the actual position of scanning head 28. Control system 70 determines the real-time correction commands according to the comparison between the actual position of scanning head 28 and the expected position of scanning head 28. The Y-position of scanning head 28 is corrected by deflecting the position of collimated beams of light 14 produced by light source and detector assembly 42. This is achieved by deflecting the position of collimated beams of light 14 that are within a viewing window of scanning head 28 parallel to the Y-axis. The deflecting is achieved by control system 70 sending a real-time correction command to a deflection apparatus. In a preferred embodiment of the present invention, the deflection apparatus is implemented as a piezoelectric crystal, which deforms when a voltage is voltage to the surfaces thereof and thereby deflects collimated beams of light 14. In the most preferred embodiment of the present invention, the deflection apparatus includes a reflecting element 64 and an actuator 66. Actuator 66 is associated with reflecting element 64 and actuator 66 is configured to rotate reflecting element 64 in a direction 68, thereby deflecting collimated beams of light 14. Reflecting element 64 is disposed within the optical path of collimated beams of light 14, between light source and detector assembly 42 and scanning head 28. Reflecting element 64 is typically a mirrored surface and actuator 66 is typically a piezoelectric actuator. The viewing window of scanning head 28 is defined as the area of the inspection surface of the sample, which is viewed by scanning head 28. Therefore, moving reflecting element 64 compensates not only for location errors of scanning head 28 on the Y-axis resulting from mechanical inaccuracies, but also allows constant movement of stage 24 parallel to the Y-axis, while scanning is still performed in straight lines along the X-axis. The correction of the Y-position of scanning head 28 is explained in more detail with reference to FIGS. 3a and 3b. The correction of the X-position of scanning head 28 is achieved by adjusting the time between exposures of light sensing system 22. Control system 70 sends a real-time correction command to light source and detector assembly 42 to adjust the time between exposures of light sensing system 22.

Figure 3A:
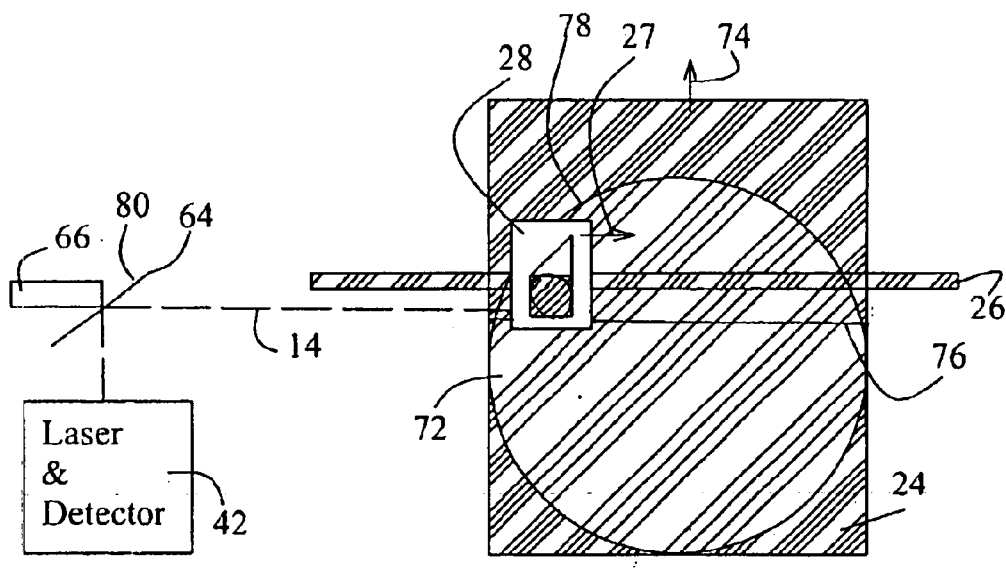
FIG. 3a is a schematic plan view of the scan displacement correction system of FIG. 2.
Figure 3B:
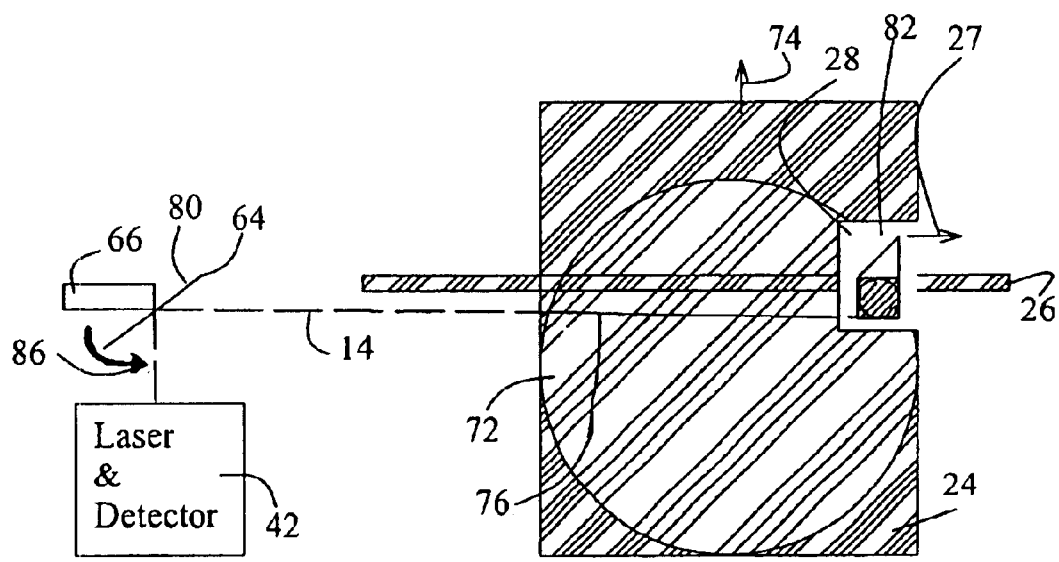
FIG. 3b is a schematic plan view of the scan displacement correction system of FIG. 2 performing a real-time correction.

Reference is now made to FIG. 3a and FIG. 3b. FIG. 3a is a schematic plan view of the scan displacement correction system and FIG. 3b is a schematic plan view of the scan displacement correction system performing a real-time correction. A wafer 72 is mounted on stage 24. Stage 24 is moving at a constant speed in a direction 74, direction 74 being parallel to the Y-axis. Scanning head 28 is moving along direction of elongation 27 of linear track 26. Wafer 72 has Cartesian symmetry and wafer 72 is composed of lines and rows of cells or dies. In order to perform a scan along a line 76, which is parallel to the lines or rows of the cells or dies of wafer 72, while wafer 72 is moving in direction 74, reflecting element 64 needs to be adjusted by actuator 66 to compensate for the constant movement of wafer 72 in direction 74.

Reference is now made to FIG. 3a. At the beginning of the scanning of line 76, scanning head 28 is at a position 78 and reflecting element 64 is at a position 80. Position 80 is determined so that reflecting element 64 directs collimated beams of light 14 produced by light source and detector assembly 42 to hit scanning head 28 at its lower part so that collimated beams of light 14 are directly above line 76.

Reference is now made to FIG. 3b. During scanning, scanning head 28 moves from position 78 (FIG. 3a) to position 82. Simultaneously, stage 24 and wafer 72 are moving in direction 74. Therefore, line 76 also moves in direction 74 and line 76 is shifted upward within the viewing window of scanning head 28. Simultaneously, to the movement of scanning head 28 and stage 24, reflecting element 64 is rotated in direction 86 by actuator 66 from position 80 to position 84. Position 84 is determined so that reflecting element 64 directs collimated beams of light 14 produced by light source and detector assembly 42 to hit scanning head 28 at a higher part thereof so that collimated beams of light 14 is still directly above line 76. In a similar manner, reflecting element 64 is constantly adjusted by actuator 66 throughout the whole travel time of scanning head 28 along linear track 26. The same adjustment is repeated for each journey of scanning head 28 in both directions along direction of elongation 27 of linear track 26.

Figure 4A:
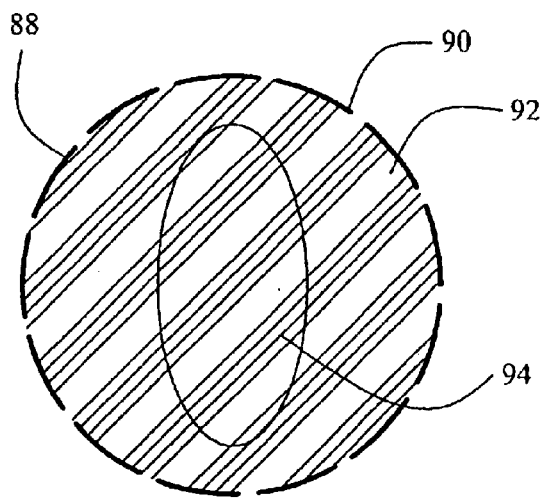
FIG. 4a is a schematic plan view of an inspection region of a surface being scanned while speed changes occur inside the inspection region for use with the Cartesian scanning system of FIG. 1.
Figure 4B:
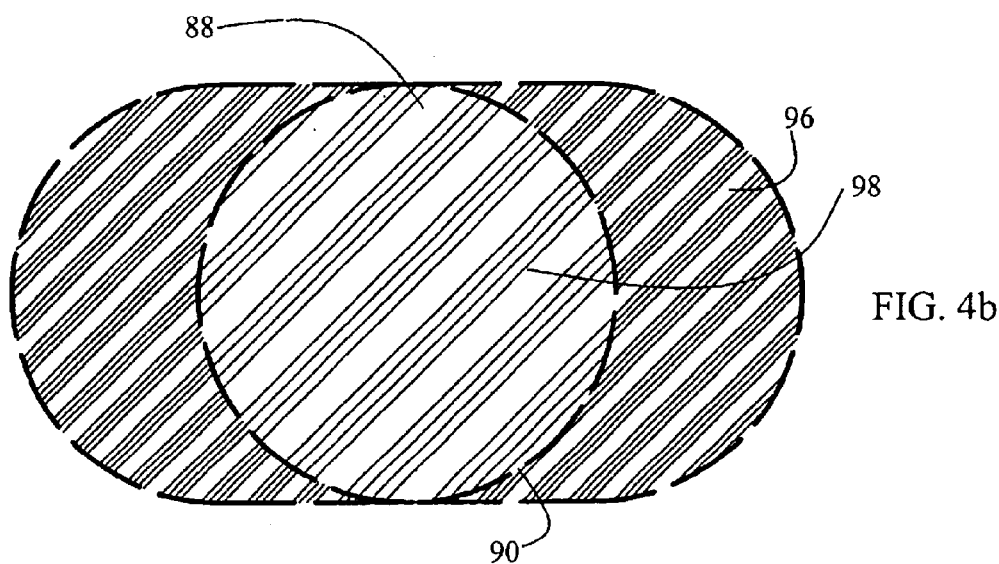
FIG. 4b is a schematic plan view of an inspection region of a surface being scanned at constant speed while speed changes occur outside the inspection region, for use with the Cartesian scanning system of FIG. 1.
Figure 4C:
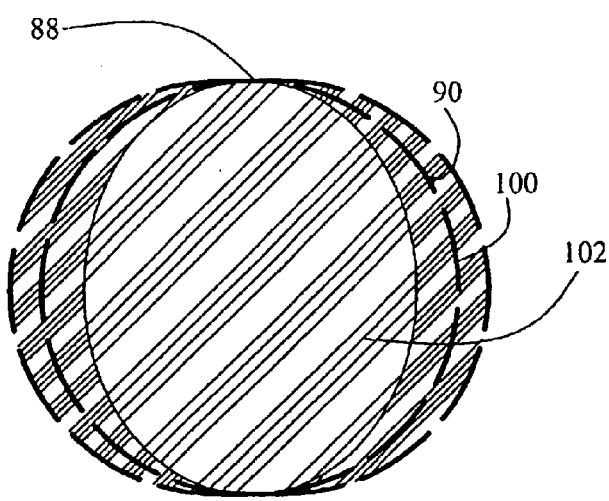
FIG. 4c a schematic plan view of an inspection region of a sample being scanned while speed changes occur partially inside and partially outside the inspection region, for use with the Cartesian scanning system of FIG. 1.

Reference is now made to FIG. 4a, FIG. 4b and FIG. 4c, which outline three options for scanning head velocity control.

Reference is now made to FIG. 4a, which is a schematic plan view of an inspection region 88 of a surface of a sample being scanned while speed changes occur inside inspection region 88 for use with the Cartesian scanning system of FIG. 1. In this first option scanning head 28 moves only within inspection region 88. A dashed line denotes the circumference 90 of inspection region 88. An area 92 is an area wherein scanning head 28 is accelerating and/or decelerating. An area 94 is an area wherein scanning head 28 is moving at constant speed. Therefore, while scanning head 28 is moving through a scanning path, scanning head 28 is accelerating and decelerating and the accelerating and decelerating of scanning head 28 is occurring over the inspection region 88. The first option provides a method of scanning with the highest throughput, but at the expense of reduced quality.

Reference is now made to FIG. 4b, which is a schematic plan view of inspection region 88 being scanned at constant speed while speed changes occur outside inspection region 88. An area 96 is an area wherein scanning head 28 is accelerating and/or decelerating. An area 98 is an area wherein scanning head 28 is moving at constant speed. Therefore, only after scanning head 28 is outside circumference 90 of inspection region 88 does acceleration and deceleration of scanning head 28 occur. This second option provides the highest quality and the simplest analysis of inspection region 88, but this option is not the most efficient method because time is wasted on velocity changes outside circumference 90.

Reference is now made to FIG. 4c, which is a schematic plan view of inspection region 88 being scanned while speed changes occur partially inside and partially outside inspection region 88. An area 100 is an area wherein scanning head 28 is accelerating and/or decelerating. An area 102 is an area wherein scanning head 28 is moving at constant speed. Therefore, while scanning head 28 is moving through a scanning path, scanning head 28 is accelerating and decelerating and at least part of the accelerating and decelerating of scanning head 28 is occurring over the inspection region 88 and part of the acceleration and part of the deceleration is occurring outside of inspection region 88. This third option provides a reasonable quality of scanning while giving better throughput when compared to the second option.

Therefore, in order to enhance throughput of the scanning process, a variable velocity approach as described with reference to FIG. 4a and FIG. 4c is applied with suitable modifications. According to the variable velocity approach, decelerating and accelerating scanning head 28 takes places over inspection region 88 during the scanning process. Implementation of this method requires adjusting the interval between exposures of light sensing system 22 in order to maintain a substantially constant pixel size during the accelerating and the decelerating of scanning head 28. Implementation of this method also requires adjusting the intensity of the scanning beam that is produced by light source assembly 12 in an inversely proportional relationship to an exposure time of light sensing system 22, in order to keep the exposure of light sensing system 22 within the limits of light sensing system 22. Intensity control of the scanning beam is required, since at lower velocities the exposure of light sensing system 22 will be higher for the same beam intensity. The variable velocity approach can be implemented in full (FIG. 4a) or in part (FIG. 4c). Full implementation is the most time efficient method, but the full implementation results in extreme exposure at the edges of inspection region 88. Therefore, partial implementation (FIG. 4c) is a compromise between the other two options.

For the purposes of illustration, the Cartesian scanning system and methods of operation thereof has been described above with reference to an inspection device. However, it will be apparent to those skilled in the Art that the teachings of the present invention also apply, but are not limited to, a writing system wherein: (a) scanning system 10 is implemented as a writing system; (b) light source assembly 12 is configured to adjust the intensity of collimated beams of light 14 during normal operation of the writing system; (c) collimated beams of light 14 are typically substituted by a single collimated beam of light; (d) sample 25 is substituted by a medium having an optically recordable surface; (e) inspection region 88 is referred to as a writing region; and (f) lens 20, light sensing system 22, beam splitter 34 and confocal optical configuration 40 are typically not required for the writing system.

In a writing system, accelerating and decelerating the writing head through a writing path requires the following modified steps. Firstly, by adjusting the interval between shots of the light source assembly and the duration of the shots in order to maintain a substantially constant pixel spacing and a substantially constant pixel size, respectively, during accelerating and decelerating of the writing head. Secondly, by adjusting the intensity of the writing beam in an inversely proportional relationship to the duration of the shots. In an analogue writing system the frequency of modulation of the light source assembly is analogous to the duration of the shots in a digital writing system. Therefore, in an analogue writing system, the frequency of modulation of the light source assembly is adjusted in proportion to the speed of the writing head, in order to produce an image of substantially constant proportions on the medium having an optically recordable surface.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art which would occur to persons skilled in the art upon reading the foregoing description.

What is claimed is:

1. A Cartesian scanning system for scanning a surface of a sample comprising:
   (a) a light source assembly configured to produce at least one collimated beam of light;
   (b) a light sensing system;
   (c) a stage configured for mounting the sample thereon;
   (d) a linear track having a direction of elongation wherein:
      (i) said linear track and said stage are configured to move relative to each other in a direction substantially: perpendicular to said direction of elongation; and
      (ii) said light source and said light sensing system are mounted in fixed spatial relation to said linear track;
   (e) a scanning head including a reflecting system wherein:
      (i) said reflecting system is configured to direct said collimated beam of light onto the surface and to direct a beam of light reflected from the surface to said light sensing system; and
      (ii) said scanning head is slidably associated with said linear track so as to be moveable in a direction parallel to said direction of elongation; and
   (f) an auto-focus configuration disposed between said light source and said reflecting system.

2. The Cartesian scanning system according to claim 1 further comprising a beam splitter configured to enable a beam of light being transmitted by said light source and a beam of light being received by said light sensing system to share substantially a same path between the surface and said beam splitter.

3. The Cartesian scanning system according to claim 2 wherein said beam splitter is a polarizing beam splitter.

4. The Cartesian scanning system according to claim 2 wherein said light source is configured to produce a plurality of light beams that are collimated.

5. The Cartesian scanning system according to claim 1 wherein said scanning head further includes an objective lens disposed between said reflecting system and the surface and wherein said objective lens is configured to focus a light beam onto the surface.

6. The Cartesian scanning system according to claim 1 further comprising at least one bearing disposed between said scanning head and said linear track.

7. The Cartesian scanning system according to claim 1 wherein:
   (a) said stage is configured to move in a direction substantially perpendicular to said direction of elongation; and
   (b) said linear track is configured to be stationary.

8. The Cartesian scanning system according to claim 1 further comprising a position determination system configured to determine a position of said scanning head in relation to an X-position on an X-axis and a Y-position on a Y-axis, said X-axis and said Y-axis being defined in relation to said stage, said X-axis being parallel to said direction of elongation of said linear track and said Y-axis being orthogonal to said X-axis, said position determination system including:
   (a) a first reflecting element mechanically connected to said scanning head;
   (b) a first optical displacement measurement device configured to measure the distance between said first optical displacement measurement device and said first reflecting element to determine said X-position wherein said first reflecting element faces said first optical displacement measurement device;
   (c) a second reflecting element mechanically connected to said scanning head;
   (d) a third reflecting element mechanically connected to said stage wherein said third reflecting element is substantially parallel to said direction of elongation of said linear track;
   (e) a second optical displacement measurement device configured to measure the distance from said second optical displacement measurement device to said third reflecting element via said second reflecting element wherein said second reflecting element is positioned to enable a light beam to be transmitted between said second optical displacement measurement device and said third reflecting element; and
   (f) a feedback system configured to determine said Y-position of said scanning head from an output of said first optical displacement measurement device and an output of said second optical displacement measurement device.

9. The Cartesian scanning system according to claim 1 further comprising a scan displacement correction system configured to perform a real-time correction for a position of said scanning head, said position of said scanning head being defined in relation to an X-position on an X-axis and a Y-position on a Y-axis, said X-axis and said Y-axis being defined in relation to said stage, said X-axis being parallel to said direction of elongation of said linear track and said Y-axis being orthogonal to said X-axis, said scan displacement correction system including:
   (a) a control system configured to determine a real-time correction command from said X-position of said scanning head and said Y-position of said scanning head; and
   (b) a deflection apparatus disposed between said light source and said scanning head, said deflection apparatus being configured to deflect parallel to said Y-axis a position of a light beam that is within a viewing window of said scanning head in response to said real-time correction command.

10. The Cartesian scanning system according to claim 9 wherein said deflection apparatus is implemented as a piezoelectric crystal.

11. The Cartesian scanning system according to claim 9 wherein said deflection apparatus includes:
   (a) a first reflecting element; and
   (b) an actuator which is configured to move said first reflecting element in response to said real-time correction command.

12. The Cartesian scanning system according to claim 11 wherein said actuator is a piezoelectric actuator configured to move said first reflecting element.

13. The Cartesian scanning system according to claim 1 further comprising a confocal optical configuration disposed between said light sensing system and said reflecting system.

14. A method to scan a surface of a sample using a linear scanner, the scanner including a stage and a scanning head, the scanner having a light source assembly that is configured to produce a scanning beam having an adjustable intensity, the scanner having a light sensing system, the light sensing system having an associated interval between exposures of the light sensing system, the sample being mounted on the stage, the surface having an inspection region, the method comprising the steps of:
 (a) moving the scanning head through a scanning path, said moving including accelerating and decelerating the scanning head wherein at least part of said accelerating and decelerating occurs over the inspection region;
 (b) adjusting the interval between exposures of the light sensing system in order to maintain a substantially constant pixel size during said accelerating and said decelerating; and
 (c) adjusting the intensity of the, scanning beam in an inversely proportional relationship to a exposure time of the light sensing system.

15. The method of claim 14 wherein part of said acceleration and part of said deceleration occurs outside of the inspection region.

16. A position determination system configured to determine a position of a scanning head of a Cartesian scanning system, the scanning system having a stage configured to mount a sample thereon, the scanning system having a linear track having a direction of elongation, the linear track and the stage being configured to move relative to each other in a direction substantially perpendicular to the direction of elongation, the scanning head being slidably associated with the linear track so as to be moveable in a direction parallel to the direction of elongation, the position of the scanning head being defined in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the position determination system comprising:
 (a) a first reflecting element having a plane of reflection that is parallel to the Y-axis wherein said first reflecting element is mechanically connected to the scanning head;
 (b) a first optical displacement measurement device configured to measure the distance between said first optical displacement measurement device and said first reflecting element to determine the X-position,
 (c) a second reflecting element mechanically connected to the scanning head;
 (d) a third reflecting element having a plane of reflection that is parallel to the X-axis wherein said third reflecting element is mechanically connected to the stage;
 (e) a second optical displacement measurement device configured to measure the distance from said second optical displacement measurement device to said third reflecting element via said, second reflecting element wherein said second reflecting element is positioned to enable a light beam to be transmitted between said second optical displacement measurement device and said third reflecting element; and
 (f) a feedback system configured to determine the Y-position of the scanning head from an output of said first optical displacement measurement device and an output of said second optical displacement measurement device.

17. The position determination system according to claim 16 further configured to perform a real-time correction for the position of the scanning head, the scanner including a light source, the positive feedback system further including:
 (a) a control system configured to determine a real-time correction command from the X-position of the scanning head and the Y-position of the scanning head; and
 (b) a deflection apparatus disposed between the light source and the scanning head, said deflection apparatus being configured to deflect parallel to the Y-axis a position of a light beam that is within a viewing window of the scanning head in response to said real-time correction command.

18. The position determination system according to claim 17 wherein said deflection apparatus is implemented as a piezoelectric crystal.

19. The position determination system according to claim 17 wherein said deflection apparatus includes:
 (a) a fourth reflecting element; and
 (b) an actuator which is configured to move said fourth reflecting element in response to said real-time correction command.

20. The position determination system according to claim 19 wherein said actuator is a piezoelectric actuator configured to move said fourth reflecting element.

21. A scan displacement correction system configured to perform a real-time correction for a position of a scanning head of a Cartesian scanning system, the scanning system having a stage configured to mount a sample thereon, the scanning system having a light source, the scanning system having a linear track having a direction of elongation, the linear track and the stage being configured to move relative to each other in a direction substantially perpendicular to the direction of elongation, the scanning head being slidably associated with the linear track so as to be moveable in a direction parallel to the direction of elongation, the position of the scanning head being defined in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the scan displacement correction system including:
 (a) a control system configured to determine a real-time correction command from the X-position of the scanning head and the Y-position of the scanning head; and
 (b) a deflection apparatus disposed between the light source and the scanning head, said deflection apparatus being configured to deflect parallel to the Y-axis a position of a light beam that is within a viewing window of the scanning head in response to said real-time correction command.

22. The scan displacement correction system according to claim 21 wherein said deflection apparatus is implemented as a piezoelectric crystal.

23. The scan displacement correction system according to claim 21 wherein said deflection apparatus includes:
 (a) a reflecting element; and
 (b) an actuator which is configured to move said reflecting element in response to said real-time correction command.

24. The scan displacement correction system according to claim 23 wherein said actuator is a piezoelectric actuator configured to move said reflecting element.

25. A method to perform a real-time correction for a position of a scanning head of a Cartesian scanning system, the scanning system having a stage configured to mount a sample thereon, the scanning system having a linear track having a direction of elongation, the linear track and the stage being configured to move relative to each other in a direction substantially perpendicular to the direction of elongation, the scanning head being slidably associated with the linear track so as to be moveable in a direction parallel to the direction of elongation, the position of the scanning head being defined in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the method comprising the steps of:
   (a) determining a real-time correction command from the X-position of the scanning head and the Y-position of the scanning head due to a misalignment of at least one of the X-position and the Y-position of the scanning head from an expected position of the scanning head; and
   (b) deflecting a position of a light beam parallel to the Y-axis in response to said real-time correction command, said light beam being within a viewing window of the scanning head.

26. A Cartesian writing system for writing on an optically recordable surface of a medium comprising:
   (a) a light source assembly configured to produce a collimated beam of light having an adjustable intensity;
   (b) a stage configured for mounting the medium thereon;
   (c) a linear track having a direction of elongation wherein:
      (i) said linear track and said stage are configured to move relative to each other in a direction substantially perpendicular to said direction of elongation; and
      (ii) said light source is mounted in fixed spatial relation to said linear track;
   (d) a writing head including a reflecting system wherein:
      (i) said reflecting system is configured to direct said collimated beam of light onto the optically recordable surface; and
      (ii) said writing head is slidably associated with said linear track so as to be moveable in a direction parallel to said direction of elongation; and
   (e) an auto-focus configuration disposed between said light source and said reflecting system.

27. The Cartesian writing system according to claim 26 wherein said writing head further includes an objective lens disposed between said reflecting system and the optically recordable surface and wherein said objective lens is configured to focus a light beam onto the optically recordable surface.

28. The Cartesian writing system according to claim 26 further comprising at least one bearing disposed between said writing head and said linear track.

29. The Cartesian writing system according to claim 26 wherein:
   (a) said stage is configured to move in a direction substantially perpendicular to said direction of elongation; and
   (b) said linear track is configured to be stationary.

30. The Cartesian writing system according to claim 26 further comprising a position determination system configured to determine a position of said writing head in relation to an X-position on an X-axis and a Y-position on a Y-axis, said X-axis and said Y-axis being defined in relation to said stage, said X-axis being parallel to said direction of elongation of said linear track and said Y-axis being orthogonal to said X-axis, said position determination system including:
   (a) a first reflecting element mechanically connected to said writing head;
   (b) a first optical displacement measurement device configured to measure the distance between said first optical displacement measurement device and said first reflecting element to determine said X-position wherein said first reflecting element faces said first optical displacement measurement device;
   (c) a second reflecting element mechanically connected to said writing head;
   (d) a third reflecting element mechanically connected to said stage wherein said third reflecting element is substantially parallel to said direction of elongation of said linear track;
   (e) a second optical displacement measurement device configured to measure the distance from said second optical displacement measurement device to said third, reflecting element via said second reflecting element wherein said second reflecting element is positioned to enable a light beam to be transmitted between said second optical displacement measurement device and said third reflecting element; and
   (f) a feedback system configured to determine said Y-position of said writing head from an output of said first optical displacement measurement device and an output of said second optical displacement measurement device.

31. The Cartesian writing system according to claim 26 further comprising a displacement correction system configured to perform a real-time correction for a position of said writing head, said position of said writing head being defined in relation to an X-position on an X-axis and a Y-position on a Y-axis, said X-axis and said Y-axis being defined in relation to said stage, said X-axis being parallel to said direction of elongation of said linear track and said Y-axis being orthogonal to said X-axis, said displacement correction system including:
   (a) a control system configured to determine a real-time correction command from said X-position of said writing head and said Y-position of said writing head; and
   (b) a deflection apparatus disposed between said light source and said writing head, said deflection apparatus being configured to deflect parallel to said Y-axis a position of a light beam that is within a viewing window of said writing head in response to said real-time correction command.

32. The Cartesian writing system according to claim 31 wherein said deflection apparatus is implemented as a piezoelectric crystal.

33. The Cartesian writing system according to claim 31 wherein said deflection apparatus includes:
   (a) a first reflecting element; and
   (b) an actuator which is configured to move said first reflecting element in response to said real-time correction command.

34. The Cartesian writing system according to claim 33 wherein said actuator is a piezoelectric actuator configured to move said first reflecting element.

35. A method to write on an optically recordable surface of a medium using a linear writing system, the writing system including a stage and a writing head, the writing system having a light source assembly that is configured to produce a writing beam having an adjustable intensity, the medium being mounted on the stage, the optically recordable surface having an writing region, the method comprising the steps of:

(a) moving the writing head through a writing path, said moving including accelerating and decelerating the writing head wherein at least part of said accelerating and decelerating occurs over the writing region;

(b) adjusting the interval between shots of the light source assembly and the duration of said shots in order to maintain a substantially constant pixel spacing and a substantially constant pixel size, respectively, during said accelerating and said decelerating; and (c) adjusting the intensity of the writing beam in an inversely proportional relationship to the duration of said shots.

36. The method of claim 35 wherein part of said acceleration and part of said deceleration occurs outside of the writing region.

37. A position determination system configured to determine a position of a writing head of a Cartesian writing system, the writing system having a stage configured to mount a medium thereon, the writing system having a linear track having a direction of elongation, the linear track and the stage being configured to move relative to each other in a direction substantially perpendicular to the direction of elongation, the writing head being slidably associated with the linear track so as to be moveable in a direction parallel to the direction of elongation, the position of the writing head being defined in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the position determination system comprising:

(a) a first reflecting element having a plane of reflection that is parallel to the Y-axis wherein said first reflecting element is mechanically connected to the writing head;

(b) a first optical displacement measurement device configured to measure the distance between said first optical displacement measurement device and said first reflecting element to determine the X-position;

(c) a second reflecting element mechanically connected to the writing head;

(d) a third reflecting element having a plane of reflection that is parallel to the X-axis wherein said third reflecting element is mechanically connected to the stage;

(e) a second optical displacement measurement device configured to measure the distance from said second optical displacement measurement device to said third reflecting element via said second reflecting element wherein said second reflecting element is positioned to enable a light beam to be transmitted between said second optical displacement measurement device and said third reflecting element; and (f) a feedback system configured to determine the Y-position of the writing head from an output of said first optical displacement measurement device and an output of said second optical displacement measurement device.

38. The position determination system according to claim 37 further configured to perform a real-time correction for the position of the writing head, the writing system including a light source, the positive feedback system further including:

(a) a control system configured to determine a real-time correction command from the X-position of the writing head and the Y-position of the writing head; and (b) a deflection apparatus disposed between the light source and the writing head, said deflection apparatus being configured to deflect parallel to the Y-axis a position of a light beam that is within a viewing window of the writing head in response to said real-time correction command.

39. The position determination system according to claim 38 wherein said deflection apparatus is implemented as a piezoelectric crystal.

40. The position determination system according to claim 38 wherein said deflection apparatus includes:

(a) a fourth reflecting element; and (b) an actuator which is configured to move said fourth reflecting element in response to said real-time correction command.

41. The position determination system according to claim 40 wherein said actuator is a piezoelectric actuator configured to move said fourth reflecting element.

42. A displacement correction system configured to perform a real-time correction for a position of a writing head of a Cartesian writing system, the writing system having a stage configured to mount a medium thereon, the writing system having a light source, the writing system having a linear track having a direction of elongation, the linear track and the stage being configured to move relative to each other in a direction substantially perpendicular to the direction of elongation, the writing head being slidably associated with the linear track so as to be moveable in a direction parallel to the direction of elongation, the position of the writing head being defined in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the displacement correction system including:

(a) a control system configured to determine a real-time correction command from the X-position of the writing head and the Y-position of the writing head; and (b) a deflection apparatus disposed between the light source and the writing head, said deflection apparatus being configured to deflect parallel to the Y-axis a position of a light beam that is within a viewing window of the writing head in response to said real-time correction command.

43. The displacement correction system according to claim 42 wherein said deflection apparatus is implemented as a piezoelectric crystal.

44. The displacement correction system according to claim 42 wherein said deflection apparatus includes:

(a) a reflecting element; and (b) an actuator which is configured to move said reflecting element in response to said real-time correction command.

45. The displacement correction system according to claim 44 wherein said actuator is a piezoelectric actuator configured to move said reflecting element.

46. A method to perform a real-time correction for a position of a writing head of a Cartesian writing system, the writing system having a stage configured to mount a medium thereon, the writing system having a linear track having a direction of elongation, the linear track and the stage being configured to move relative to each other in a direction substantially perpendicular to the direction of elongation, the writing head being slidably associated with the linear track so as to be moveable in a direction parallel to the direction of elongation, the position of the writing head being defined in relation to an X-position on an X-axis and a Y-position on a Y-axis, the X-axis and the Y-axis being defined in relation to the stage, the X-axis being parallel to the direction of elongation of the linear track and the Y-axis being orthogonal to the X-axis, the method comprising the steps of:

(a) determining a real-time correction command from the X-position of the writing head and the Y-position of the writing head due to a misalignment of at least one of the X-position and the Y-position of the writing head from an expected position of the writing head; and (b) deflecting a position of a light beam parallel to the Y-axis in response to said real-time correction command, said light beam being within a viewing window of the writing head.

47. A Cartesian scanning system for scanning a surface of a sample comprising:

(a) a light source assembly configured to produce at least one collimated beam of light;

(b) a light sensing system;

(c) a stage configured for mounting the sample thereon;

(d) a linear track having a direction of elongation wherein:
  (i) said linear track and said stage are configured to move relative to each other in a direction substantially perpendicular to said direction of elongation; and
  (ii) said light source and said light sensing system are mounted in fixed spatial relation to said linear track;

(e) a scanning head including a reflecting system wherein:
  (i) said reflecting system is configured to direct said collimated beam of light onto the surface and to direct a beam of light reflected from the surface to said light sensing system; and
  (ii) said scanning head is slidably associated with said linear track so as to be moveable in a direction parallel to said direction of elongation; and (f) a confocal optical configuration disposed between said light sensing system and said reflecting system.

* * * * *